United States Patent
Kim et al.

[11] Patent Number: 5,826,961
[45] Date of Patent: Oct. 27, 1998

[54] REAR PROJECTOR EMPLOYING AN IMAGE DISPLAY

[75] Inventors: Dong-ha Kim, Suwon; Chang-wan Hong, Anyang; Han-il Ko, Suwon, all of Rep. of Korea

[73] Assignee: Samsung Electronics Co., Ltd., Kyungki-Do, Rep. of Korea

[21] Appl. No.: 546,133

[22] Filed: Oct. 20, 1995

[30] Foreign Application Priority Data

Nov. 25, 1994 [KR] Rep. of Korea ............... 94-31226

[51] Int. Cl.⁶ .................................................. G03B 21/28
[52] U.S. Cl. ....................................... 353/74; 353/78
[58] Field of Search ................... 353/78, 77, 76, 353/74, 37, 34, 31, 119

[56] References Cited

U.S. PATENT DOCUMENTS

| | | | |
|---|---|---|---|
| 4,941,732 | 7/1990 | Ureda et al. | 353/78 |
| 5,278,595 | 1/1994 | Nishida et al. | 353/78 |
| 5,321,450 | 6/1994 | Shapiro et al. | 353/119 |
| 5,400,095 | 3/1995 | Minich et al. | 353/119 |
| 5,467,154 | 11/1995 | Gale et al. | 353/74 |
| 5,510,861 | 4/1996 | Minich et al. | 353/119 |
| 5,526,147 | 6/1996 | Omae et al. | 359/41 |

FOREIGN PATENT DOCUMENTS 0383038  4/1991  Japan ........................ 353/74

*Primary Examiner*—William Dowling
*Attorney, Agent, or Firm*—Sughrue, Mion, Zinn, Macpeak & Seas, PLLC

[57] ABSTRACT

A rear projector employing an image display uses a polymer dispersion liquid crystal (PDLC) panel which suppresses a turbulent reflection due to a high light refractive index. Accordingly, a slim appearance is attained since a light separating/synthesizing system is eliminated, and the resolution and brightness of the image is improved by precisely and easily controlling the change of the light pathway.

7 Claims, 5 Drawing Sheets

REAR PROJECTOR EMPLOYING AN IMAGE DISPLAY

BACKGROUND OF THE INVENTION

The present invention relates to a rear-type projector and, more particularly, to a rear-type projector employing image displaying means.

Recently, with the development of the information industry, the demand for image displaying means having larger screens has increased. In the case of a direct-viewing type cathode ray tube (CRT) constituting a television receiver, i.e., conventional image displaying means, the CRT itself should be large in order to provide a large screen. However, there are many limitations when attempting to achieve large displays in this manner. Furthermore, even if the CRT could be made somewhat larger by overcoming the technical problems, a manufactured product having such a large display tube would be overly bulky and excessively heavy.

As an alternative, an image projection system (e.g., a projection-type television or video projector) is a practical device for obtaining a large screen display by circumventing the above-described problems. In such a system, an image is generated via the use of a small CRT or liquid crystal display (LCD) and magnified by an optical lens, to be projected onto a large screen. Such an image projection system can be generally classified into either a front-type projector, as shown in FIG. 1, or a rear-type projector as shown in FIGS. 2 and 3.

Referring first to FIG. 1, the front-type projector comprises a lamp 11 for emitting white light as a light source and three transmission-type LCDs 12, 13 and 14 as video image displaying means, in front of which collimating lenses 12', 13' and 14' are provided. The light emitted from lamp 11 is reflected by a reflective mirror 15 and separated into three colors, red (R), green (G) and blue (B), by dichroic mirrors 16 and 16'. Such a separated light of each color is transmitted to the LCDs for displaying the image signal corresponding to each color. The light of each color, which has passed through the LCDs, is synthesized by a reflective mirror 15' and dichroic mirrors 17' and 18, and the synthesized light is incident to a projection lens 19. Projection lens 19 projects the image displayed on LCDs 12, 13 and 14 onto a screen 20.

The front-type LCD projector, however, has certain drawbacks. Namely, a polarizing filter should be adopted, and thus the brightness and contrast of the screen are lowered. To improve the contrast, the interior lighting should be as dim as possible, such as that of a movie theater. In addition, the apparatus must be located in the viewing area, opposite the screen.

Therefore, in order to make up for these drawbacks, the rear-type projector is adopted. The rear-type projector can be constructed to have a slimmer appearance than that of the front-type projector, and unlike the front type projector which is situated in the viewing area, the rear-type projector is concealed inside a cabinet. Also, the rear-type projector inherently affords better brightness of the displayed image.

On the other hand, the rear-type projector of FIG. 2 employs the small CRT as the image projection device. In such a device, the final image is obtained by projecting and magnifying the image onto a screen 24 installed in the front of a cabinet, by using a special cathode ray tube 21 which emits red, green and blue colors, a magnifying lens 22, and a reflecting mirror 23.

Although the rear-type projector of FIG. 2 employs a CRT similar to that of the conventional television receiver, there is a basic difference in that three images, after being formed, are magnified and projected from a small CRT onto a screen.

Since a light pathway is narrowed by the use of the small CRT in the above-described conventional rear-type projector, the full set of the apparatus can be minimized compared with the conventional front-type projector. However, there is a limit to minimize the size of such an apparatus due to the length of the CRT tube even if the light pathway is narrowed, and convergence adjustment is difficult and time consuming.

In order to overcome these problems, as shown in FIG. 3, a rear-type projector can employ an LCD as the image displaying means, instead of the small CRT.

FIG. 3 is a plan view schematically showing a structure of a conventional rear-type LCD projector. The rear-type projector shown in FIG. 3 has the same light separating/synthesizing system as that of the front-type projector shown in FIG. 1. However, the arrangement of the light separating/synthesizing system is different from that of the front-type projector. Also, the rear-type projector has an extra reflecting mirror 300. That is, the rear-type projector comprises a lamp 11 emitting white light and three transmission-type LCDs 32, 33 and 34 as video image displaying means, in front of which collimating lenses 32', 33' and 34' are provided. The light emitted from lamp 31 is reflected by a reflective mirror 35 and separated into three colors, red (R), green (G) and blue (B), by dichroic mirrors 36 and 36'. The separated light of each color is transmitted to LCDs 32, 33 and 34 for displaying the image signal corresponding to each color. The light of each color, passed through the LCDS, is synthesized by a reflective mirror 35' and dichroic mirrors 37' and 38, and the synthesized light is incident to a projection lens 39. Projection lens 39 projects the image displayed on LCDs 32, 33 and 34 onto a screen 30, after reflecting the image via reflecting mirror 300 placed at the rear of the projector, opposite to screen 30.

In the rear-type projector, as white light lamp 11 is used as a light source, the light emitted from lamp 11, which is at high temperature, may damage panels of the LCDs 32, 33 and 34. Thus, in order to prevent the LCD panels from being damaged by the generated heat, lamp 31 should be located beyond a predetermined distance from LCDs 32, 33 and 34. That is, the light source and the LCD panels should be separated from each other by a predetermined distance, which increases the size of the apparatus. Therefore, to provide a projector having a slim appearance, reflecting mirror 300 is placed at the rear of the projector, opposite to screen 30, and the pathway of the light passed through the light separating/synthesizing system is altered by the reflecting mirror 300. However, the precise control of the light pathway for obtaining high image quality is difficult when altered in the light separating/synthesizing system. Also, the aperture of the projection lens has a limitation in size, which makes it difficult to increase the viewing angle.

SUMMARY OF THE INVENTION

To solve the above problems, it is an object of the present invention to provide a rear projector in which the change of the light pathway is precisely and easily controlled by eliminating a light separating/synthesizing system, so that the resolution and brightness can be improved and a slim appearance can be obtained.

To achieve the above object, there is provided a rear projector comprising: a light source for emitting light along a path; first light pathway changing means for altering the path of the light emitted from the light source and transmitting a path-altered light; image displaying means for receiving the path-altered light from the first light pathway changing means; a projection lens for altering the pathway of the light which has passed through the image displaying means by a predetermined angle; second light pathway changing means for reflecting the light which has passed through the projection lens along a predetermined pathway; and a screen located in the predetermined pathway of the light reflected from the second light pathway changing means.

In the rear projector according to the present invention, it is preferable that the image displaying means is a polymer dispersion liquid crystal panel, and the first light pathway changing means alters the light pathway by 90°, by being placed at a 45° angle with respect to the axis of the light emitted from the light source. Also, preferably, the projection lens alters the pathway of light by a predetermined angle with respect to the light axis altered by the first light pathway changing means and has an f-number of greater than 8.0. In addition, it is preferable that the image displaying means and projection lens are positioned such that the angle formed between the axis of the light which has passed through the image displaying means and the axis of the light which has passed through the projection lens is less than 90°.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE PREFERRED EMBODIMENT

Figure 1:
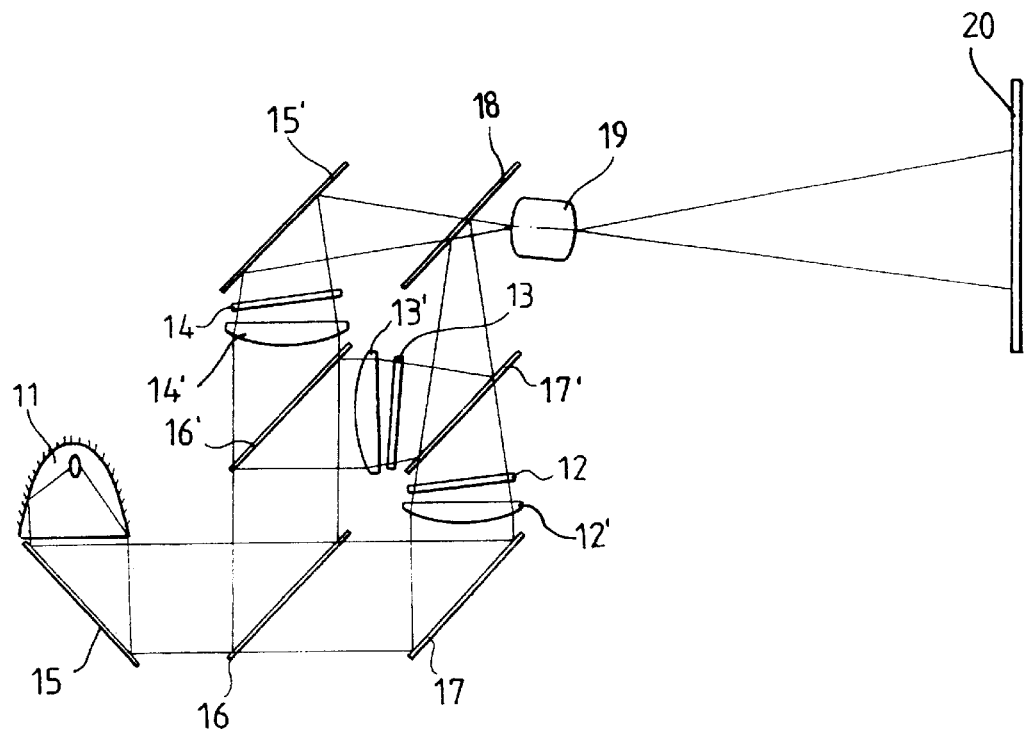
FIG. 1 is a plan view schematically showing an optical system of a conventional front-type LCD projector.
Figure 2:
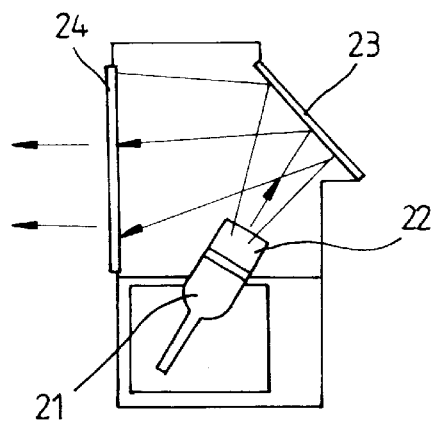
FIG. 2 is a plan view schematically showing an optical system of a conventional rear-type CRT projector.
Figure 3:
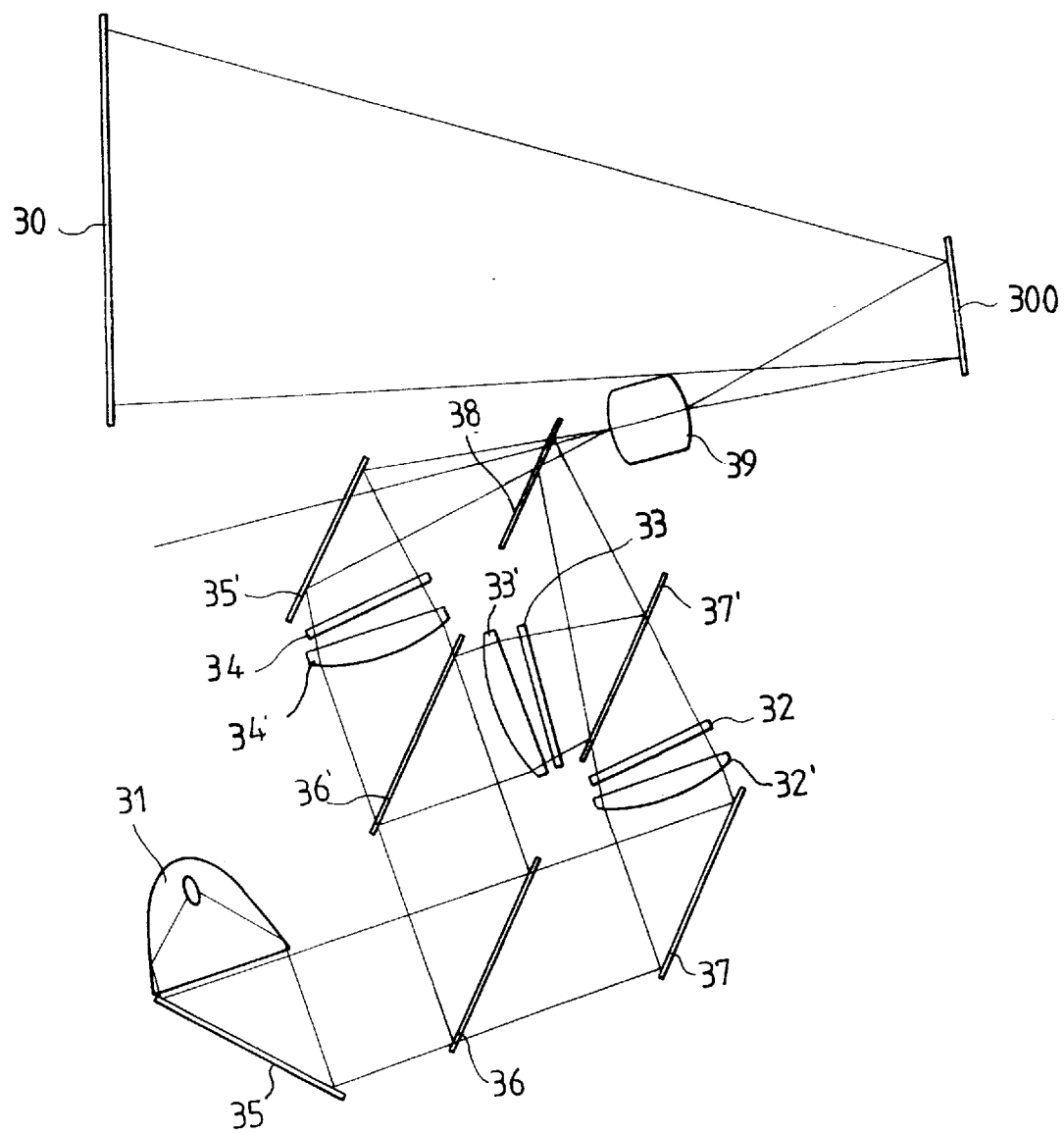
FIG. 3 is a plan view schematically showing an optical system of a conventional rear-type LCD projector.
Figure 4:
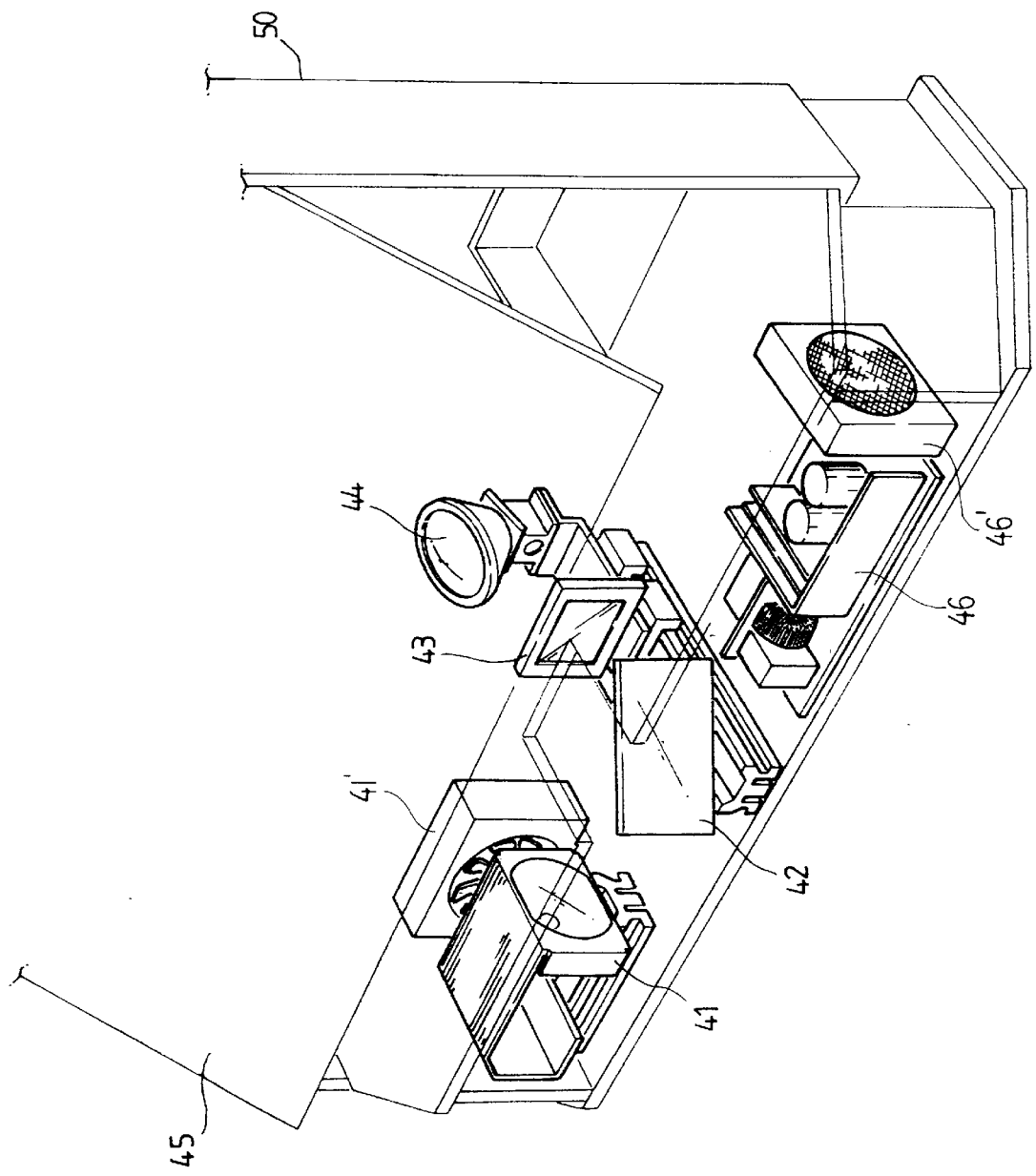
FIG. 4 is a partially cutaway perspective view of a rear-type projector employing a polymer dispersion liquid crystal (PDLC) display panel according to the present invention.
Figure 5:
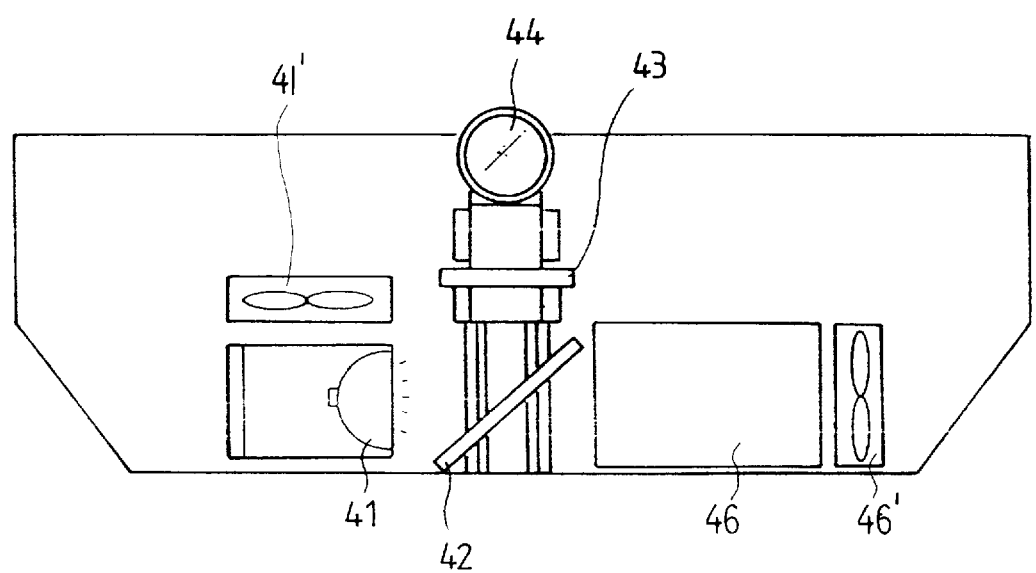
FIG. 5 is a plan view schematically showing the optical system of the rear-type projector of FIG. 4.
Figure 6:
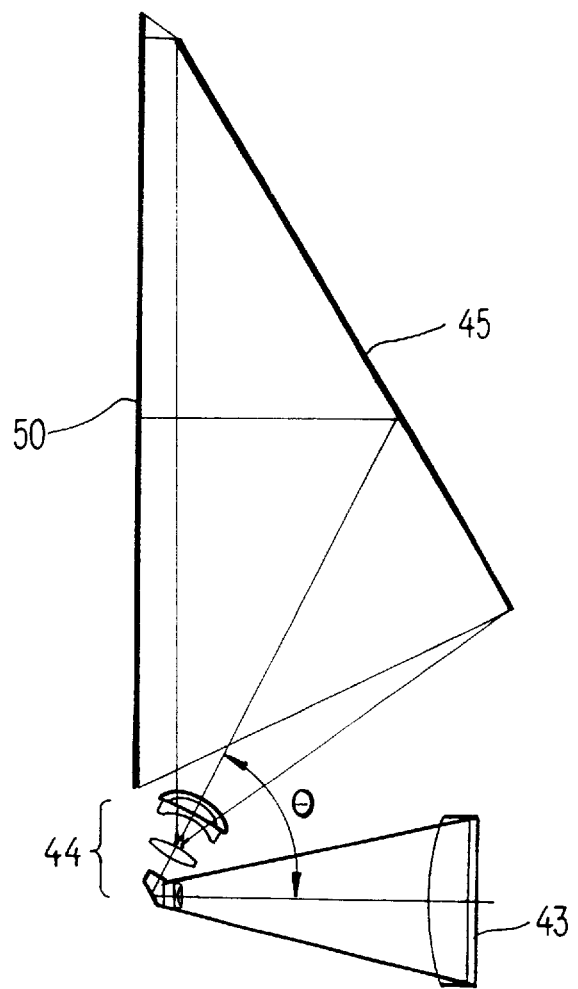
FIG. 6 is a diagram schematically showing the main parts of the optical system of the rear-type projector according to the present invention.

Referring to FIGS. 4 and 5, the rear-type projector according to the present invention comprises a white light lamp 41 as a light source and a first reflecting mirror 42 as first light pathway changing means for altering the pathway of the light emitted from white light lamp 41, by about 90°. First reflecting mirror 42 is placed at a 45° angle with respect to the optical axis. The rear projector includes a polymer dispersion liquid crystal (PDLC) display panel 43 as the displaying means, through which the light, whose optical axis is changed by 90° by the first reflecting mirror 42, passes, to thereby form an image, and a projection lens 44 for altering again the light pathway by a predetermined angle with respect to the pathway of the light passing through PDLC display panel 43. The rear projector also includes a second reflecting mirror 45 as the light pathway changing means for reflecting the light passed through projection lens 44 along a predetermined pathway, and a screen 50 located in the path of the light reflected from the second reflecting mirror 45. Reference numerals 41' and 46' represent cooling fans and reference numeral 46 represents a circuit driver. Also, PDLC display panel 43 and projection lens 44 are positioned as shown in FIG. 6, where the angle (θ) formed between the axis of the light which has passed through the PDLC display panel 43 and the axis of the light which has passed through the projection lens 44 is less than 90°.

In the rear projector according to the present invention, having the above-described structure, the light emitted from white light lamp 41 is transmitted to the PDLC display panel 43, while the pathway of the light emitted from white light lamp 41 is changed by 90° by the first reflecting mirror 42. Thereafter, the light which has passed through PDLC display panel 43 is transmitted to the projection lens 44 for altering again the light pathway. The light which has passed through the projection lens 44 forms an image on the screen 50 located in the pathway of the light reflected via the second reflecting mirror 45.

In the rear projector according to the present invention, for forming the image through the above-described procedure, PDLC display panel 43 in which a liquid crystal drop is discontinuously dispersed on a polymer layer in a fine cell state, operates by a voltage applied to an electrode of the polymer layer. The PDLC display panel is suitable for a high density image display due to its sensitive operational response and can be more easily manufactured than a conventional display device employing the liquid crystal.

That is, in the case of the rear projector according to the present invention, the f-number of the projection lens can be above 8.0 since the PDLC panel is used as the image displaying means. Accordingly, a wider angle of view can be obtained as compared with the conventional LCD projector wherein the f-number of the projection lens is below 4.5.

Generally, the f-number representing the lens aperture is expressed as following formula (1).

$$f\text{-number} = \text{focal distance}/\text{lens aperture} \tag{1}$$

Thus, as the f-number increases, the lens aperture decreases, and on the contrary, as the f-number decreases, the lens aperture increases. For example, the aperture of a lens whose f-number is 4.5 is greater than that of a lens whose f-number is 8.0.

As a result, a wider angle of view can be designed, and the size of the whole projector system can be sharply reduced and a more slim appearance can be provided.

As described above, the rear projector according to the present invention employs a PDLC display panel as the image displaying means so that an image exhibiting high brightness characteristics can be obtained. Thus, by using the liquid crystal panel including RGB pixels, the change of the light pathway can be easily and precisely controlled. As a result, the resolution can be improved and a rear-type projector having a slim appearance can be provided.

It is contemplated that numerous modifications may be made to the rear projector of the present invention without departing from the spirit and scope of the invention as defined in the following claims.

What is claimed is:

1. A self-contained, rear projector comprising:

a light source for emitting light along a path;

first light pathway changing means for altering the path of the light emitted from said light source and transmitting a path-altered light;

an image displaying device which receives the path-altered light from said first light pathway changing means, said image displaying device comprising a polymer dispersion liquid crystal panel;

a projection lens for altering the pathway of the light which has passed through said image displaying device by a predetermined angle, said projection lens having an f-number of greater than 8.0;

second light pathway changing means for reflecting the light which has passed through said projection lens along a predetermined pathway; and a screen having a rear surface and a front viewing surface and being located in the predetermined pathway of the light reflected from said second light pathway changing means, such that said rear surface of said screen receives the light reflected from said second light pathway changing means and a displayed image is formed on said front viewing surface of said screen.

2. The rear projector as claimed in claim 1, wherein said first light pathway changing means alters the path of the light emitted from said light source by 90°, by being placed at a 45° angle with respect to the axis of the light emitted from said light source.

3. The rear projector as claimed in claim 1, wherein said projection lens alters the pathway of the light, which has passed through said image displaying device, by a predetermined angle with respect to the axis of the path-altered light which is altered by said first light pathway changing means.

4. The rear projector as claimed in claim 1, wherein said image displaying device and said projection lens are positioned such that an angle θ formed between an axis of the light which has passed through said image displaying device and an axis of the light which has passed through said projection lens is less than 90°.

5. The rear projector as claimed in claim 1, wherein said projection lens directly receives the light which has passed through said image displaying device.

6. A rear projector comprising:

a light source for emitting light along a path;

first light pathway changing means for altering the path of the light emitted from said light source and transmitting a path-altered light;

image displaying means for receiving the path-altered light from said first light pathway changing means;

a projection lens for altering the pathway of the light which has been passed through said image displaying means by a predetermined angle, said projection lens having an f-number of greater than 8.0;

second light pathway changing means for reflecting the light which has passed through said projection lens along a predetermined pathway; and a screen located in the predetermined pathway of the light reflected from said second light pathway changing means.

7. A rear projector comprising:

a light source for emitting light along a path;

first light pathway changing means for altering the path of the light emitted from said light source and transmitting a path-altered light;

image displaying means for receiving the path-altered light from said first light pathway changing means, said image displaying means comprising a polymer dispersion liquid crystal panel;

a projection lens for altering the pathway of the light which has passed through said image displaying means by a predetermined angle, said projection lens having an f-number of greater than 8.0;

second light pathway changing means for reflecting the light which has passed through said projection lens along a predetermined pathway; and a screen located in the predetermined pathway of the light reflected from said second light pathway changing means.

* * * * *